W. F. FERGUSON.
FASTENER FOR BREAST YOKES AND THE LIKE.
APPLICATION FILED JUNE 29, 1914.
1,218,069.
Patented Mar. 6, 1917.
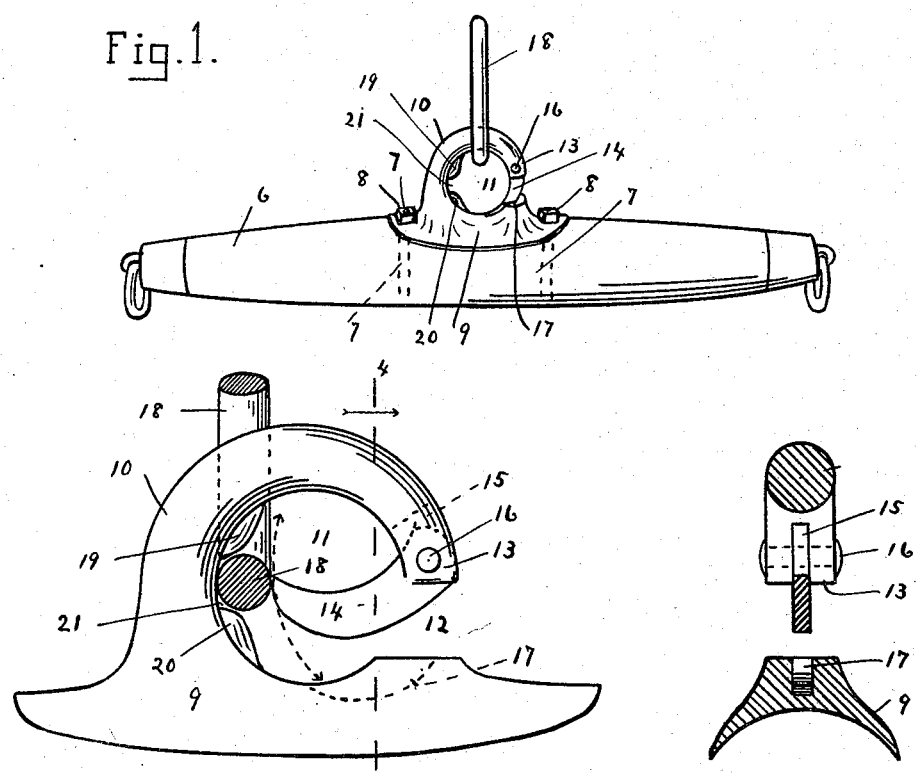
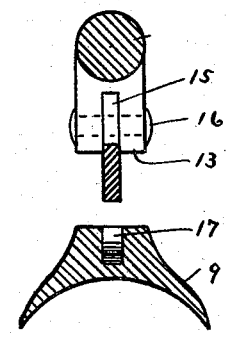
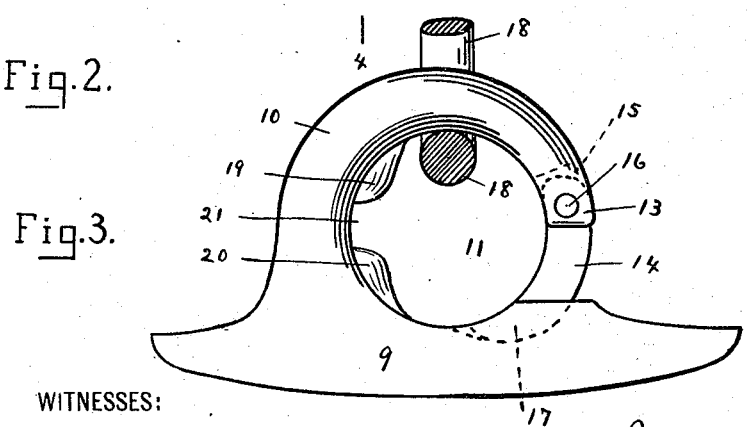
WITNESSES:
INVENTOR
William F. Ferguson
BY Martin & Jones
ATTORNEYS

UNITED STATES PATENT OFFICE.

WILLIAM F. FERGUSON, OF ROME, NEW YORK.

FASTENER FOR BREAST-YOKES AND THE LIKE.

1,218,069.     Specification of Letters Patent.     Patented Mar. 6, 1917.

Application filed June 29, 1914. Serial No. 847,880.

*To all whom it may concern:*

Be it known that I, WILLIAM F. FERGUSON, of Rome, in the county of Oneida and State of New York, have invented certain new and useful Improvements in Fasteners for Breast-Yokes and the like; and I do hereby declare that the following is a full, clear, and exact description thereof, which will enable others skilled in the art to which it appertains to make and use the same, reference being had to the accompanying drawings, and to the reference-numerals marked thereon, which form part of this specification.

My present invention relates to detachable hook fasteners such as are particularly adapted for and are used in connection with breast or jockey yokes, whiffle trees, neck yokes and the like, but which may be used in a great variety of places where such a detachable fastener is desired. The invention is illustrated herein and is illustrated in the drawings and described in the specification as adapted to a fastener for breast yokes, but it will be obvious that the invention is not limited to such uses.

The purpose of my invention is to provide an improved fastener of the class described which is strong and simple in construction, easily operated either to connect or disconnect the parts and which is particularly unlikely to become accidentally detached.

A further purpose of my invention is to provide a fastener of the class described which obviates the necessity of a spring or other yielding member to keep the latch of the hook closed.

A still further purpose of my invention is to have the fastener so constructed that it is practically impossible for the link or ring which is detachably secured to the breast yoke hook to occupy a position from which it can accidentally escape from the hook at the same time that the latch is withdrawn into a position where the loop can pass thereby. The construction, however, is such that the parts can be readily detached when so desired by manual operation of the latch and of the link relative to the hook.

Figure 1 is a perspective view of a fastener embodying my device applied to a breast or jockey yoke.

Fig. 2 is a side elevation on an enlarged scale of the fastener with the latch partly open and with the link in the single position where the latch can pass thereby.

Fig. 3 is a side view of the fastener on a similar enlarged scale showing the latch closed and the link occupying its ordinary working position.

Fig. 4 is a vertical sectional view on line 4—4 of Fig. 2.

Referring to the drawings in a more particular description there is secured in desired position upon the breast or jockey yoke or similar member 6 as by bolts 7 and nuts 8 the elongated base 9 of a C-shaped hook 10 having a main aperture 11 and an opening 12 thereinto to one side of the hook and extending well toward the hook base 9 leaving the free end 13 of the hook extending about half way back toward the base 9 as plainly indicated in the drawings. Upon the free end 13 of the hook is hingedly or pivotally mounted a curved latch 14 as by having the outer end of said latch set into a slot 15 in the end 13 and pierced by a pin 16 extending through the end transversely of the slot as plainly indicated in Fig. 4. The inner side of latch 14 is preferably curved to conform when closed to the main curve or shape of the aperture 11. Opposite the end 13 the hook base 9 is provided with a slot 17 into which the free end of latch 14 fits and against the bottom of which the outer side of the said latch toward its end seats when the latch is in closed position preventing the latch from moving outwardly from the position shown in Fig. 3 but allowing the latch to be moved inwardly past its position shown in Fig. 2. The fit of latch 14 at its joint with the end 13 and especially in the slot 17 is close enough preferably to prevent the latch swinging about by its own weight or through movement of the neck yoke, but still permitting the latch to be readily moved by a person's finger or upon the latch being pressed inwardly by the person pressing the ring or link 18 against the outer side of the latch.

The hook 10 on the side of its aperture 11 opposite the hook opening 12 is provided with a pair of oppositely disposed projections or lugs 19 and 20 spaced apart leaving therebetween a recess 21 about in the center of the side of the aperture opposite the hook opening 12 and opening out into the main aperture 11 of the hook. The width of the recess 21 is sufficient to readily hold the usual ring or link 18 which is to be detachably secured to the hook 10 while the depth of the recess, the size of aperture 11 and the length of the latch 14 is such and the parts are so arranged that the link 18 must occupy the recess 21 in order for the latch 14 to pass the link 18 or in other words the latch 14 can only pass the link when the link is in the recess.

The operation of the device is as follows: Assuming the hook to be empty, and the latch to be in closed position, as shown in Fig. 3, the link 18 is placed upon the hook by pressing the latch 14 inwardly to the position shown in Fig. 2 or a little therepast according to the exact diameter of the link 18, the pressing of latch 14 inwardly being done either by direct pressure of the finger or by the operator pressing the link 18 against the outer side of latch 14 as most convenient. The latch 14 having been pressed aside sufficiently to allow the link to be passed into the aperture of the hook the link is temporarily held in the recess 21 in order to afford an opportunity for latch 14 to be closed. After the latch has been returned to closed position the link 18 will ordinarily move from the recess 21 and occupy the outer part of the hook aperture 11 as indicated in Fig. 3, but may move around in said aperture freely without any danger of disengagement as long as the latch is in closed position and in fact ordinarily backward action of the link 18 will press the latch 14 back to closed position.

To detach the parts of this fastener the link 18 must be temporarily held in the recess 21 and the latch 14 opened and passed thereby and then the link passed outward by the outer side of said latch and out through the hook opening 12. Accidental disengagement of the parts of the fastener is very unlikely since the two relatively movable parts have to occupy middle position at the same time, namely the link in the recess 21 and the latch at about middle position. If the latch is forward of middle position backward movement of the link will close the latch or at least move it past middle position so as to make it impossible for the link to move thereby. If the latch is back of middle position backward movement of the link will close the latch. If the link is in the forward half of the aperture 11 its movement against the curved inner side of latch 14 will ordinarily close the latch or at least move it back from middle position so that when the link gets to the recess 21 the latch will be too far back for the link to pass thereby. It will thus be seen that the cotemporaneous occupying of necessary position accidentally by the latch 14 and link 18 is very unlikely indeed.

In my preferred construction in fact the parts are so arranged and proportioned that with a link of full size that the fastener should be used with, backward movement of the link into the recess 21 will necessarily move the latch so far backward that further backward movement of the link or movement of the link toward the opening 12 will cause the link to press against the point of the latch and push it to closed position with the link still within the hook so that with a link of this size after the link has been placed in the recess 21 it is necessary to move the latch slightly forward past the link in the recess in order to move the link backward and outwardly to the rear of the latch and without closing the latch. With the parts so arranged and proportioned it will be obvious that accidental disengagement of the fastener is still more unlikely because the link must not only be in the recess and the latch at a middle position but the latch must at that time then be moved slightly forward or further movement of the link will close the latch and prevent the escapement of the link from the hook.

What I claim as new and desire to secure by Letters Patent is:

A detachable fastener for breast yokes and the like, comprising a base portion adapted to be secured to the breast yoke and a C-shaped hook rigidly extending therefrom and having its opening at one side adjacent the base, having its main aperture extending farther from the base than the opening of the hook and having opening from the main aperture and opposite the hook opening a relatively small recess between the base and the outer portion of the main aperture, a latch hinged to the free end of the hook adapted to close the hook opening and to swing inwardly adjacent to and past said recess and a draw link adapted to be inserted through the opening of said hook and adapted to pass said latch and into the outward part of the main aperture, its normal working position, only by being first temporarily placed in said recess while said latch is swung back toward closed position, and able to be removed from the hook and out past said latch only by being again temporarily placed in said recess while the latch is swung past the draw link.

In witness whereof I have affixed my signature, in the presence of two witnesses, this 25th day of June, 1914.

WILLIAM F. FERGUSON.

Witnesses:
GEORGE WM. THRONE,
HARRIET WILLIAMS.

Copies of this patent may be obtained for five cents each, by addressing the "Commissioner of Patents, Washington, D. C."